(12) United States Patent
Locht et al.

(10) Patent No.: US 6,304,429 B1
(45) Date of Patent: Oct. 16, 2001

(54) ELECTRICAL EQUIPMENT ACCESSORY MOUNTING ASSEMBLY

(75) Inventors: Guillermo A. Locht, Nogales, AZ (US); Ralph D. Keech, Mountain View, MO (US); Louis Liu, Farmington, CT (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/473,179

(22) Filed: Dec. 28, 1999

(51) Int. Cl.[7] .............. H02B 1/26; H02B 1/04; H01H 85/02; H01H 85/54
(52) U.S. Cl. .......... 361/623; 361/628; 361/603; 361/626; 361/692; 337/186; 337/187
(58) Field of Search .................... 361/603, 626, 361/642, 646, 833, 835, 837, 627, 628, 836, 807, 38–41; 337/186–189, 283

(56) References Cited

U.S. PATENT DOCUMENTS

| | | | |
|---|---|---|---|
| 1,510,350 | * 9/1924 | Thomas | 361/646 |
| 3,631,323 | * 12/1971 | Pittman | 317/61.5 |
| 3,637,918 | * 1/1972 | Pasen | 174/158 R |
| 3,916,258 | * 10/1975 | Westrom | 317/15 |
| 4,178,063 | 12/1979 | Reynolds . | |
| 4,250,476 | * 2/1981 | Evans et al. | 335/17 |
| 4,257,662 | * 3/1981 | Motten, Jr. | 339/186 R |
| 4,355,345 | 10/1982 | Franchet . | |
| 4,507,701 | 3/1985 | Fujiwara et al. . | |
| 4,791,394 | * 12/1988 | Mikulecky | 335/174 |
| 4,845,476 | 7/1989 | Rangeard et al. . | |
| 5,213,298 | * 5/1993 | Johnson | 248/313 |
| 5,296,998 | 3/1994 | Jergenson et al. . | |
| 5,475,570 | * 12/1995 | Harr | 361/825 |
| 5,893,627 | * 4/1999 | Tague | 362/133 |
| 5,982,267 | * 11/1999 | Locht | 337/186 |

FOREIGN PATENT DOCUMENTS

| | | | |
|---|---|---|---|
| 607321-A | * 12/1978 | (CH) | 337/227 |
| 4421690-A1 | * 6/1994 | (DE) | A47B/5/16 |
| 7-272820-A | * 10/1995 | (JP) | H01T/1/12 |

* cited by examiner

Primary Examiner—Leo P. Picard
Assistant Examiner—Anatoly Vortman
(74) Attorney, Agent, or Firm—Cantor Colburn LLP; Carl B. Horton

(57) ABSTRACT

The accessory mounting assembly for supporting a plurality of fuses for electrical distribution equipment has a mounting bracket having a mid-portion and top and bottom bent ends. A mounting board, for supporting at least one fuse, is attached to the mounting bracket. The mounting board has a series of notches in one end of the mounting board and a multiplicity of bolt holes at a distal end from at least one of the notches. This mounting board configuration provides a compact holding formation for fuses or lightning arresters.

10 Claims, 6 Drawing Sheets

ELECTRICAL EQUIPMENT ACCESSORY MOUNTING ASSEMBLY

BACKGROUND OF THE INVENTION

The present invention relates generally to an accessory mounting assembly for electrical distribution equipment. More specifically, the present invention relates to an accessory mounting assembly for supporting internal lightning arrestors and/or additional fuses such as expulsion or weak-link fuses.

Distribution transformers are utilized to step voltage levels up or down in electrical power distribution systems. Stepping up the voltage levels of the electrical power reduces the current required to carry that power and minimizes line losses. However, a great deal of heat is emitted when the power passes through the transformers, therefore the transformers are often cooled by being immersed in containers filled with a cooling liquid such as oil. This is especially true when high power is involved.

Electrically connected to the transformers are fuses which provide various forms of current protection, e.g., over current protection, current limiting protection, and energy limiting protection, for the distribution transformers and the distribution system as a whole, particularly against lightning strikes. Fuse holders are utilized for supporting these fuses. The fuses and fuse holders are often mounted to the distribution transformers themselves and immersed in the same cooling liquid.

One type of device that is held by a fuse holder is a lightning arrester. When lightning strikes a transformer or near one, a lightning arrester can provide a discharge path to a ground. Typically, each lightning arrester is retained by a holder that consumes a large volume within a transformer.

Generally, fuse holders for distribution transformers generally contain a large number of bulky parts, and are therefore costly to assemble and difficult to manufacture to desired quality standards. Moreover, these fuse holders do not have a standard design. Many different types of fuse holders are utilized to accommodate the various fuses connected to the distribution transformers.

Additionally, the cooling oil presents a harsh environment to the fuses and fuse holders. This oil is subject to extreme temperature ranges, e.g., from −30 degrees centigrade to 140 degrees centigrade. Therefore expansion and contraction of the fuses and fuse holders must be taken into account in order to maintain a safe distance between fuses. However, this adds to the undesirable size, complexity, and variety of the fuse holders.

Additionally adding to the size of the fuse holders is the requirement to maintain a proper creep distance between the fuses. In high voltage multi-phase situations, e.g., fuses electrically connected to the three phases of a distribution transformer, a significant voltage differential will develop between the ends of the fuses protecting each phase. This voltage differential will cause a current (creep current) to conduct on the surface of the fuse support between the ends of the fuses mounted on a fuse holder if the fuses are not positioned a safe distance (creep distance) apart. The requirement to maintain a safe creep distance between each fuse mounted on a fuse holder significantly increases the overall size of the fuse holder even if the fuse holder is comprised of non-conductive material.

Furthermore, the containers into which the fuses, fuse holders and transformers are immersed have a limited capacity, and the wire cables used in the installation of this type of equipment are bulky. Therefore, wire routing around the fuse holders is difficult in the limited space available.

BRIEF SUMMARY OF THE INVENTION

The present invention provides an accessory mounting assembly for supporting a plurality of fuses for electrical distribution equipment. The accessory mounting assembly comprises a mounting bracket having a mid-portion and top and bottom bent end, and a mounting board having a notch in one end of said mounting board and a multiplicity of bolt holes at a distal end from the notch. The mounting board is attached to the mounting bracket at least at one bolt hole. This accessory mounting assembly can be proximately arranged with a transformer wherein the transformer is for an electrical power distribution system. The assembly is used to secure electrical distribution equipment to the transformer wherein the electrical distribution equipment is electrically connected with the transformer.

BRIEF DESCRIPTION OF THE DRAWINGS

Referring now to the drawings wherein like elements are numbered alike in the several Figures.

DESCRIPTION OF THE INVENTION

Figure 1:
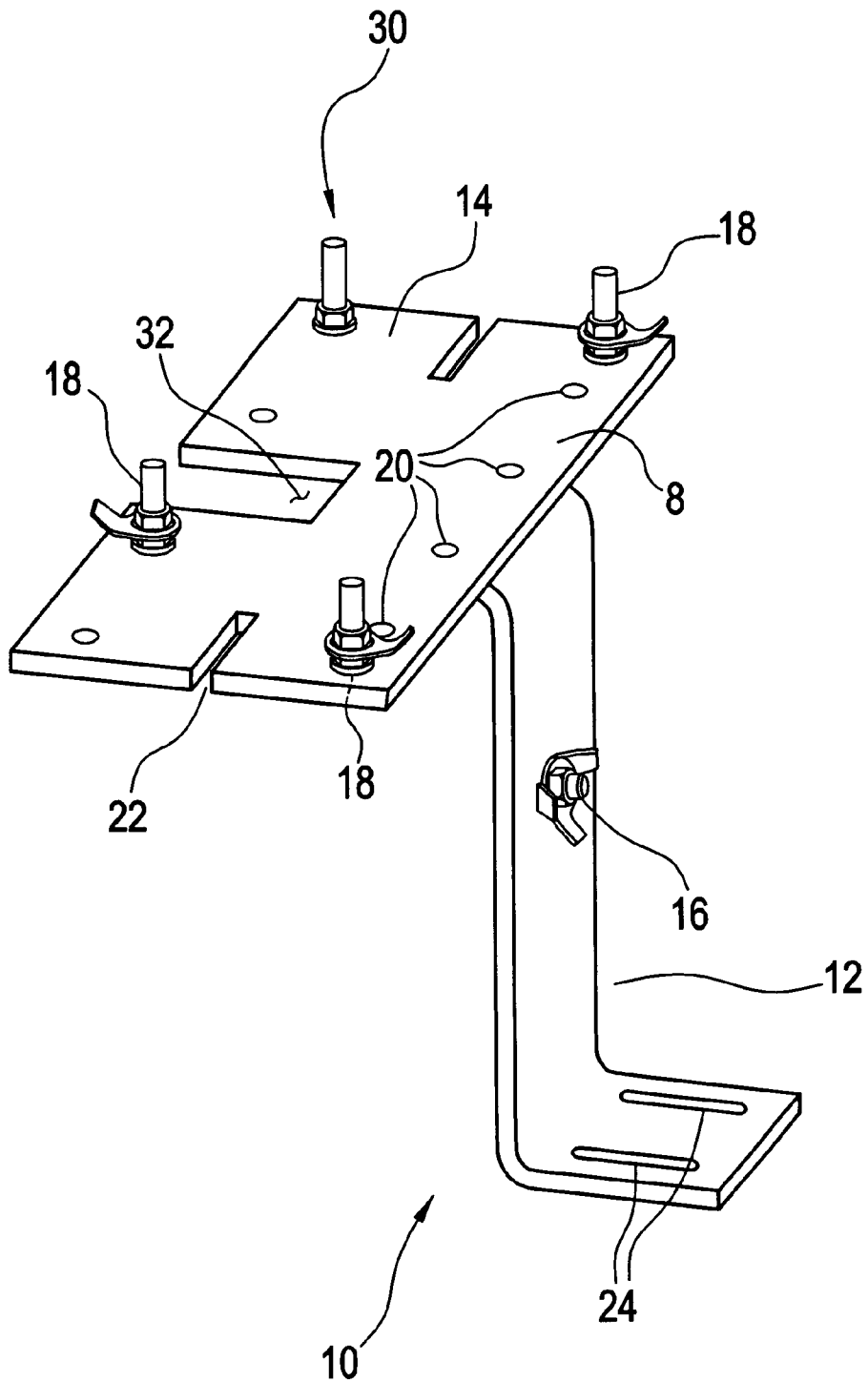
FIG. 1 is a perspective view of an accessory mounting assembly embodying the present invention shown.

Referring to FIG. 1, the accessory mounting assembly 10 comprises a mounting board 14 physically connected to mounting bracket 12. Disposed through mounting board 14 are phase connection terminals 18 and HO disconnect 30.

The mounting board 14, which is preferably designed to accept various amounts of bolts, e.g. to attach fuses thereto, has a series of bolt holes 20 disposed throughout mounting board 14. Preferably, a first side 8 of mounting board 14 has a sufficient amount of bolt holes 20 to allow for attaching and holding mounting board 14 to bracket 12. Additional bolt holes 20 are provided for attachment of internal lightning arresters 28 (shown in FIG. 3) and additional fuses.

The size and geometry of the mounting board 14 is dependent upon the specific application, including the transformer rating, the number of internal lightning arresters, fuses, and phase connection terminals, to be employed. The mounting board 14 has a sufficient construction to provide the desired structural integrity to support any attachments affixed thereto and to provide a sufficient insulating function, i.e., mounting board 14 can be composed of a glass mat base laminated polyester sheet material such as commercially available as General Electric Corporation material specification A19B13 or similar. This material typically has an average minimum tracking resistance at an inclined plane with a time-to-track at 2.5 kV of about 150 to about 600 minutes with a preferred average minimum of about 300 minutes.

Again, the width, height, and geometry of mounting board 14 are application specific, with numerous overall geometries possible, such as generally square, rectangular, hexagonal, octagonal, trapezoidal, among others. For example, as is shown in FIG. 1, the overall geometry can be generally rectangular with various openings to enable closer placement of parts, e.g. notch 32, and to address creep distance, e.g. slots 22.

Figure 5:
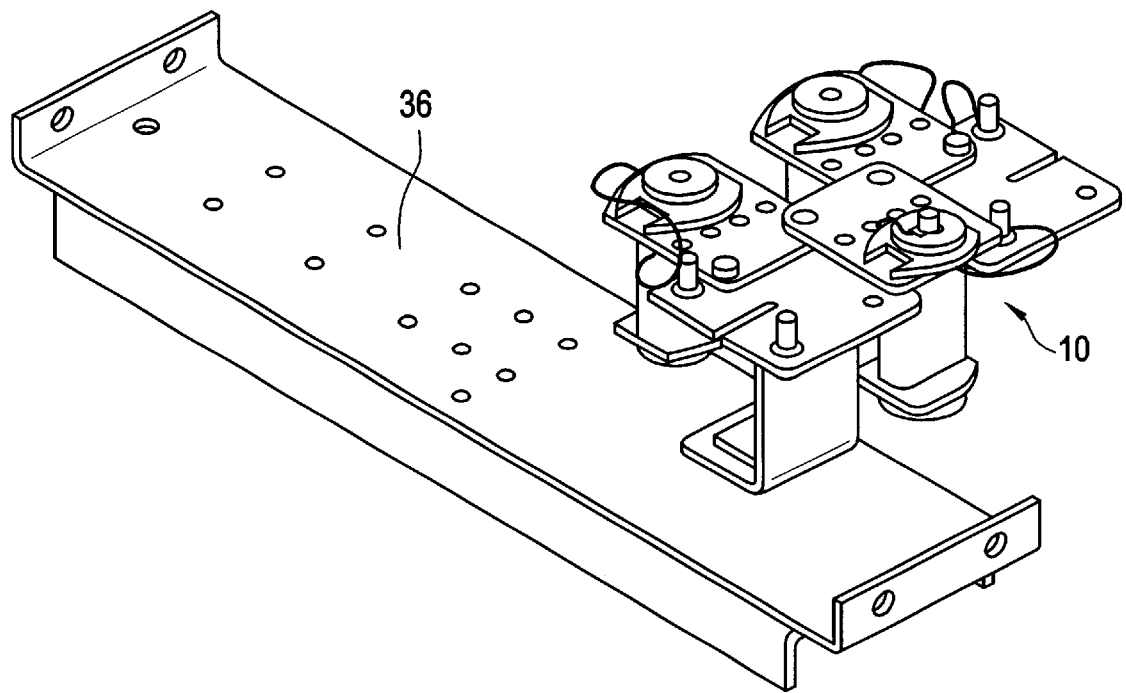
FIG. 5 is a perspective view of an accessory mounting assembly attached to a support plate.

Mounting board 14 is supported by the mounting bracket 12. Mounting bracket 12 has attachment openings for attaching mounting board 14 and attaching a completed accessory mounting assembly 10 to a support plate 36 (as shown in FIG. 5). Preferably, opposing ends of mounting bracket 12 have a sufficient amount of mounting bracket slots 24 (or other attachable openings) to secure the bracket in the desired location. Disposed on or through the mounting bracket 12 is a ground terminal 16, which is generally a lug or bolt.

The configuration of mounting board 14 is dependent upon the specific application of the accessory mounting assembly 10. The size and geometry of the mounting board 14 determines the construction of mounting bracket 12. This includes the number of internal lightning arresters, fuses, phase connection terminals, and other attachments to be employed within the defined space of the electrical distribution equipment. For example, the assembly may be designed in accordance with a transformer for an electrical power distribution system wherein the assembly would be disposed in a housing of the transformer or disposed in communication with the transformer. Preferably, mounting bracket 12 is formed somewhat in a shape of a step (step-shaped) with the top and bottom portions bent away from the mid-portion of the bracket in opposing right angles. Although, the step-shaped mounting bracket is shown in FIGS. 1–8, formations such as I-shaped or C-shaped brackets among others could be used. Generally, mounting bracket 12 is constructed from a conductive material such as metal so that any charge fed into ground terminal 16 is conducted thereby into support plate 36 and away from mounting board 14.

The top portion of mounting bracket 12 has through hole(s) or mounting bracket slot(s) (not depicted). These openings are aligned with bolt holes 20 of the mounting board 14, and through each aligned opening, a bolt 26 is secured so that mounting board 14 held to and by mounting bracket 12. With a step-shaped mounting bracket 12, mounting board 14 is positioned atop a mid-portion of mounting bracket 12 at a right angle on a top bent portion of mounting bracket 12.

A bottom portion of mounting bracket 12 has mounting bracket slot(s) 24. These slot(s) are aligned with hole(s) in support plate 36 where the mounting bracket 12 is affixed to the support plate 36. With a step-shaped mounting bracket 12, support plate 36 is positioned below the mid-portion of mounting bracket 12 at a right angle.

Figure 3:
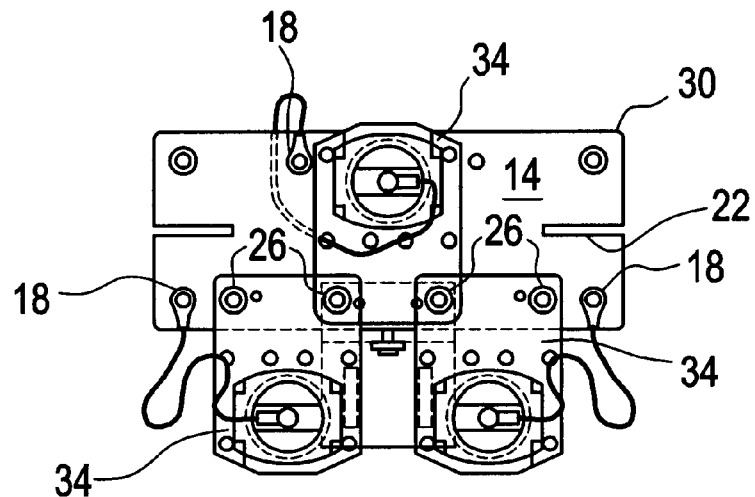
FIG. 3 is a top view of an accessory mounting assembly with attached adapter support plates holding fuses.
Figure 4:
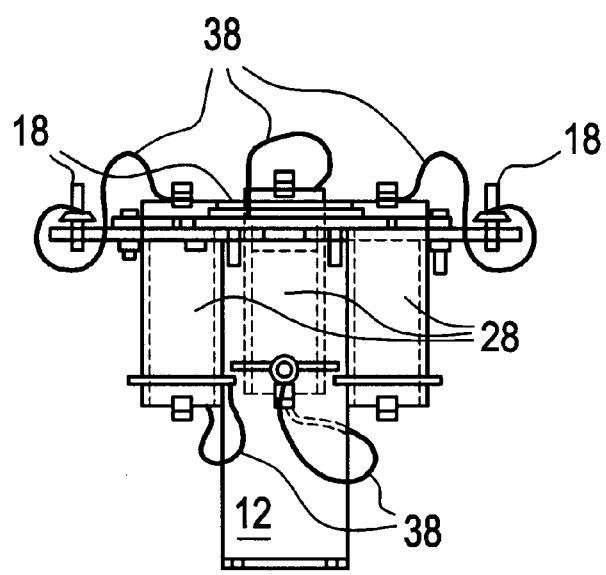
FIG. 4 is a front view of the accessory mounting assembly shown in FIG. 3.

Bolt hole(s) 20 in mounting board 14 and bolt(s) 26 simultaneously and advantageously hold an adapter support plate 34 (shown in FIGS. 3 and 4). Support plate 34 is generally configured to support internal lightning arresters 28. Preferably, bolt holes 20 are linearly formed along side 8 of a rectangular mounting board 14 along an end that is away from notch 32. Notch 32 is a portion removed from mounting board 14 at a distant end from side 8 where mounting bracket 12 connects with mounting board 14. Notch 32 allows for the closer placement of parts such as when several internal lightning arresters 28 are being supported. Thereby, if three internal lightning arresters 28 are being supported, only four bolt holes 20 and bolts 26 are needed to hold mounting bracket 12 and mounting board 14 together while also holding each of the three adapter support plates 34 with two bolts 26.

Phase connection terminals 18, one for each internal lightning arrester, also contacts or goes through mounting board 14. An HO disconnect 30, which is also known as the common ground, forms a common connection point where, for example, all three phases of a three phase transformer connect, depending on the electrical connection and/or configuration required for the particular transformer. The location of the HO disconnect 30 is electrically isolated from the other phases.

Figure 2:
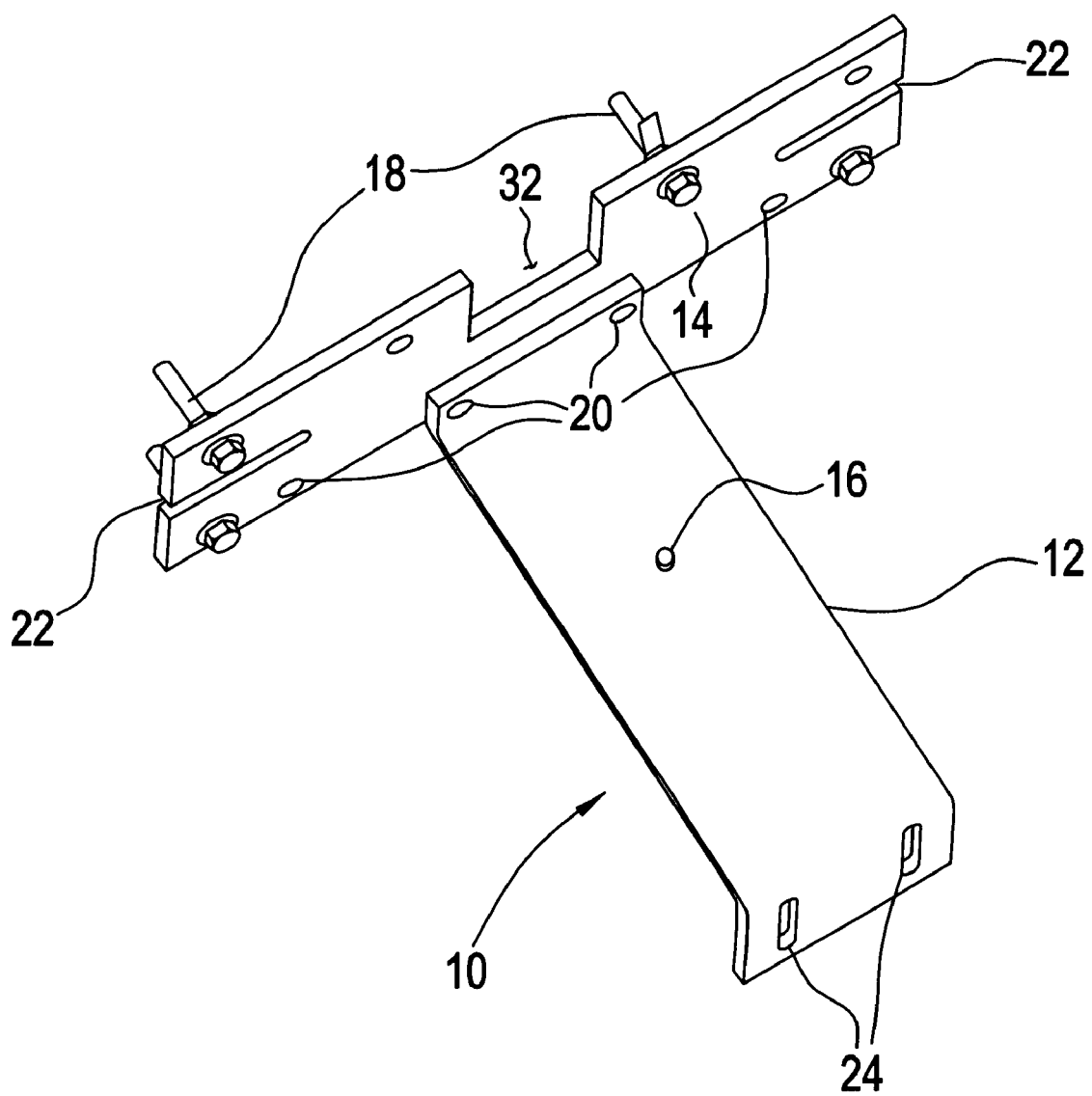
FIG. 2 is a perspective view of the bottom of the accessory mounting assembly shown in FIG. 1.

Referring to FIG. 2, a perspective view of the bottom of accessory mounting assembly 10 is shown. Therein, mounting board 14 is revealed as well as the back portion of mounting bracket 12. Mounting bracket 12 is attached to mounting board 14 at bolt holes 20. Two bolt holes 20 disposed substantially equidistant from two side ends of mounting board 14 are used in the mounting of mounting bracket 12 to mounting board 14.

Accessory mounting assembly 10 is depicted in FIGS. 3 and 4 holding three internal lighting arresters 28. A top portion of each internal lighting arrester 28 is attached to an adapter support plate 34. Each adapter support plate 34 is then attached to mounting board 14 at bolt holes 20. Open portions on each adapter support plate 34, for the attachment of adapter support plate 34 to mounting board 14, are aligned and attached to bolt holes 20. The open portions on each adapter support plate 34 are positioned in an end portion of adapter support plate 34 opposite the end portion where the internal lighting arrester 28 contacts the adapter support plate 34. When using three adapter support plates 34 attached to mounting board 14, a triangular formation of three internal lighting arresters 28 is formed. In this configuration, notch 32 accepts a housing of one of the internal lightning arresters. By advantageously using notch 32 in mounting board 14, the internal lightning arresters 28 are held in the triangular formation using only the four mounting board bolts 26. Using this triangular formation, a plurality of internal lightning arresters and/or fuses can be disposed on the mounting board 14 in a limited amount of space and using a minimal amount of bolts and mounting apertures.

In addition to being physically supported by accessory mounting assembly 10, the internal lightning arresters 28 are wired for operation. A top portion from each internal lightning arrester 28 is connected to a corresponding phase connection terminal 18 by a conducting element 38, e.g. a wire. A bottom portion from each internal lightning arrester 28 is connected to the ground terminal 16 by a conducting element 38.

Figure 6:
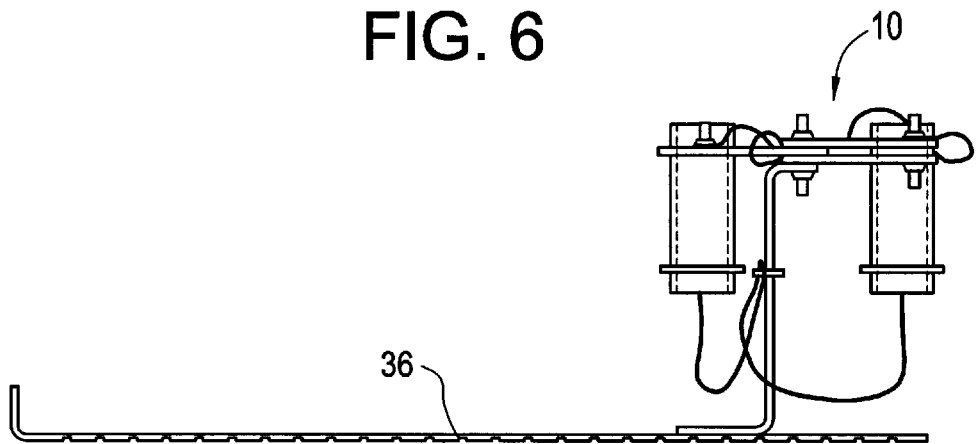
FIG. 6 is a side view of the accessory mounting assembly shown in FIG. 5.

As show in FIGS. 5 and 6, accessory mounting assembly 10 is attached by affixing mounting bracket slots 24 over corresponding holes in support plate 36. Because of the reduced mounting area needed by accessory mounting assembly 10 as compared to traditional individual supports, a larger portion of support plate 36 is open for additional assemblies required by a transformer. The accessory mounting assembly 10 and support plate 36 can then be submerged in cooling liquid within a transformer.

Figure 7:
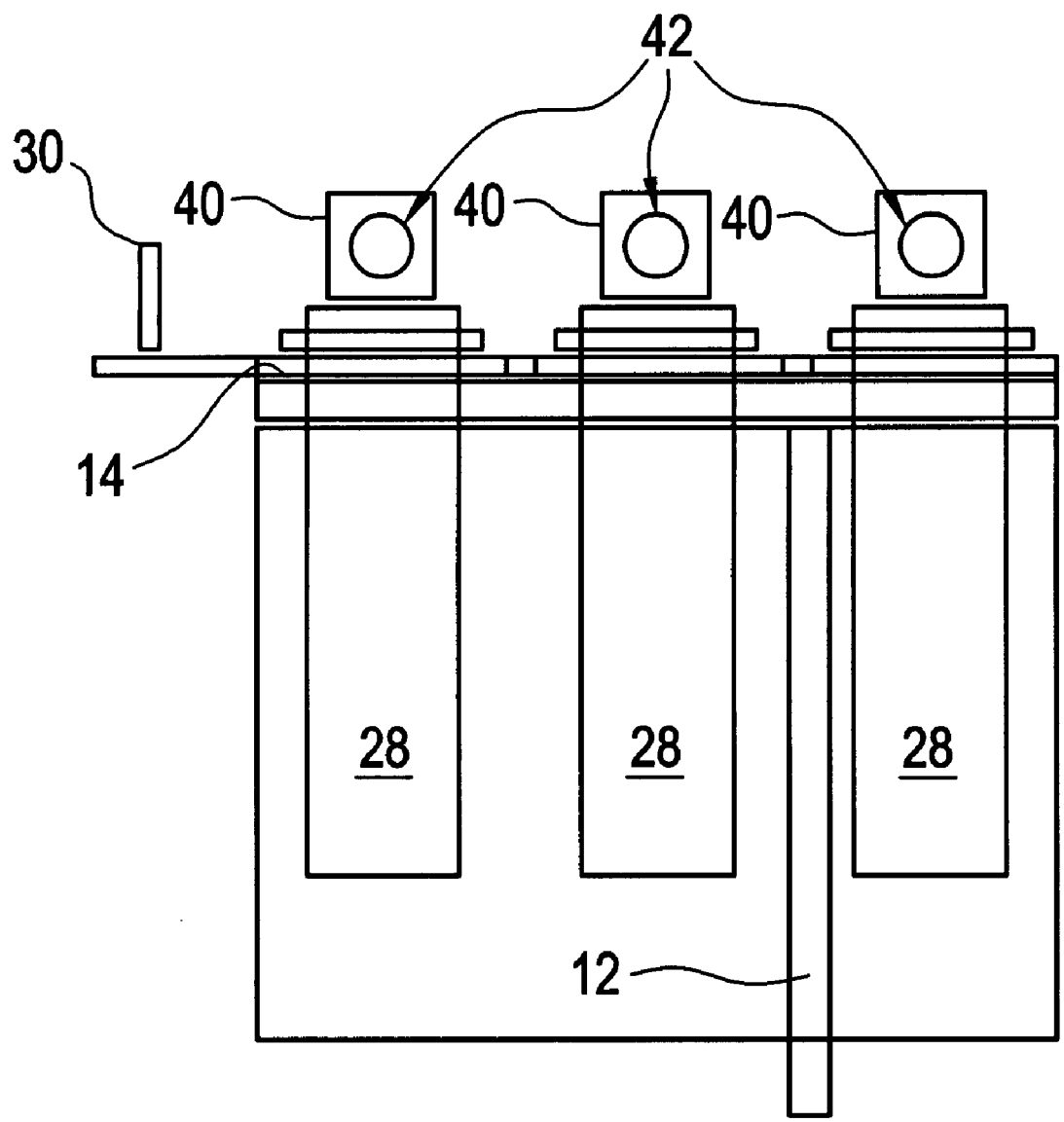
FIG. 7 is a front view of an accessory mounting assembly having both internal lightning arresters and expulsion fuses attached.
Figure 8:
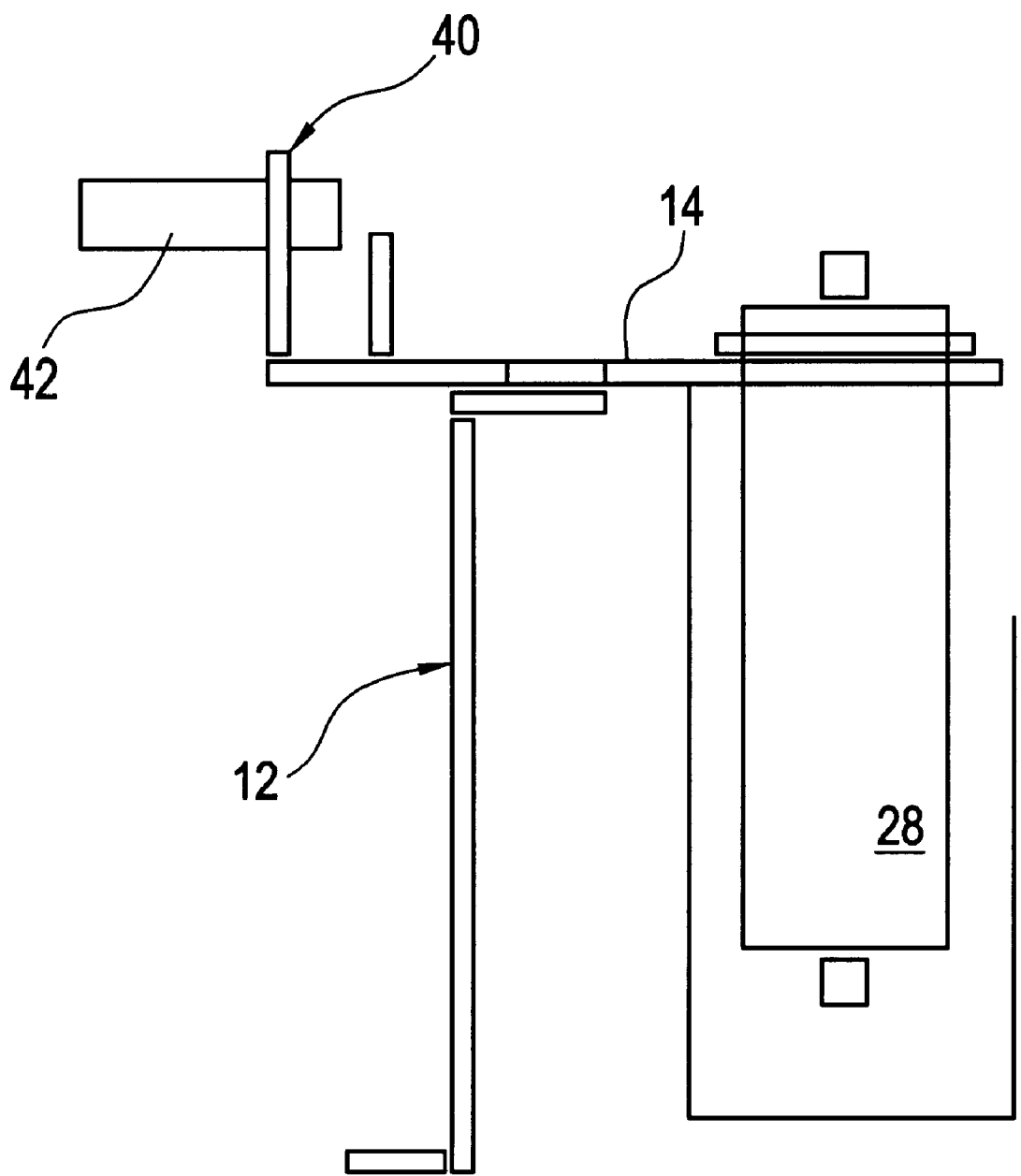
FIG. 8 is a side view of the accessory mounting assembly shown in FIG. 7.

Supplemental fuse holders 40 are affixed onto the edges of mounting board 14 as shown in FIGS. 7 and 8. Each supplemental fuse holder 40 can retain an additional fuse such as an expulsion fuse 42 or a weak link fuse (not depicted). Thereby, a single accessory mounting assembly 10 replaces several individual holders for several fuses, internal lightning arresters, and an HO disconnect. While shown as an L-shaped bracket bolted to mounting board 14, supplemental fuse holder 40 can be of any geometry which prevents short circuiting, typically, any geometry which holds the fuse away from mounting board 14 can be employed. In the present example, up to six additional expulsion fuses 42 can be supported in addition to the three internal lightning arresters 28 by having a supplemental fuse holder 40 affixed to mounting board 14 and facing away from another supplemental fuse holder 40 thereby forming a U-shape. Additional arresters and fuses could be supported by mounting board 14 if mounting board 14 is larger via employing the triangular internal lightning arrester arrangement of the present invention in conjunction with mounting fuses 42 on brackets 40 angled away from the mounting board 14.

The disclosed invention provides several improvements some of which are stated here for the purpose of example only. First, a reduced number of mounting assembly designs are now required to support a multiplicity of fuses where previously a many more designs were used to achieve the same result. For example, 10 designs in accordance with the accessory mounting assembly of the present invention replaced 78 different designs.

Another improvement of the design of the mounting board and mounting bracket is that it allows for a triangular formation of fuses such as internal lightning arresters, reducing the mounting area required as compared to using standard assemblies. For example, using an old fuse holder design, the required dimensions were 17.75 by 15.5 by 5.5 inches (1,513.18 cubic inches). Whereas with the new design of the present invention, the dimensions are 12.5 by 9.5 by 9 inches (1,068.75 cubic inches). This yields an average reduction in volume of 29%.

This design also allows for an increased ease of wiring an accessory mounting as the fuse connection points are readily accessible. Thereby allowing for an increased rate of production. Also, one common assembly can provide several functions at once. For example, the assembly can support internal lightning arresters and, if desired, can support additional fuses such as expulsion or weak link fuses, while additionally serving as an HO disconnect point.

There are several advantages of the assembly in accordance with the disclosed invention. One of the most important advantages being that the new design has a reduced complexity. Also, the number of designs utilizing the assembly in accordance with the invention has a reduced number of variations particularly in comparison with prior art designs. The assembly requires less space and material costs in addition to utilizing standardized wiring routings. Thereby, the time to manufacture these designs is comparatively reduced by utilizing assemblies in accordance with the disclosed invention.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. An accessory mounting assembly for electrical distribution equipment, comprising:

a mounting bracket having a, mid-portion and a top and a bottom bent end;

a mounting board having notch in one end of said mounting board and a multiplicity of bolt holes at a distal end from said notch; and said mounting board is attached to said mounting bracket at least at one bolt hole.

2. The accessory mounting assembly of claim 1, further comprising up to three internal lightning arresters fixedly attached to said mounting board in a triangular arrangement.

3. The accessory mounting assembly of claim 2, further comprising a ground disposed through said mid-portion of said mounting bracket, wherein said internal lightning arresters are electrically connected to said ground.

4. The accessory mounting assembly of claim 1, further comprising at least one supplemental fuse holder fixedly attached to said mounting board at a sufficient angle to inhibit an electrical short.

5. The accessory mounting assembly of claim 1, wherein said mounting board includes at least one slot disposed therein for increasing electrical creep distance between said electrical distribution equipment.

6. A transformer for an electrical power distribution system, comprising:

an accessory mounting assembly proximately arranged with said transformer for securing electrical distribution equipment thereto, said electrical distribution equipment being electrically connected with said transformer, said accessory mounting assembly including:

a mounting bracket having a mid-portion and a top and a bottom bent end;

a mounting board having notch in one end of said mounting board and a multiplicity of bolt holes at a distal end from said notch; and said mounting board is attached to said mounting bracket at least at one bolt hole.

7. The transformer of claim 6, wherein said accessory mounting assembly further comprises up to three internal lightning arresters fixedly attached to said mounting board in a triangular arrangement.

8. The transformer of claim 7, wherein said accessory mounting assembly further comprises a ground disposed through said mid-portion of said mounting bracket, wherein said internal lightning arresters are electrically connected to said ground.

9. The transformer of claim 6, wherein said accessory mounting assembly further comprises at least one supplemental fuse holder fixedly attached to said mounting board at a sufficient angle to inhibit an electrical short.

10. The transformer of claim 6, wherein said accessory mounting assembly flirter comprises said mounting board including at least one slot disposed therein for increasing electrical creep distance between said electrical distribution equipment.

* * * * *